US009409281B2

(12) United States Patent
Aguayo et al.

(10) Patent No.: US 9,409,281 B2
(45) Date of Patent: Aug. 9, 2016

(54) CLAMPING DEVICE FOR A GOLF CLUB HEAD

(71) Applicant: DUNLOP SPORTS COMPANY, LTD., Kobe (JP)

(72) Inventors: Roberto Aguayo, Downey, CA (US); Carl J. Crotteau, Buena Park, CA (US); Simon A. Ecob, Mesa, AZ (US); Lawrence Melendez, North Hollywood, CA (US)

(73) Assignee: DUNLOP SPORTS CO. LTD., Kobe (JP)

( * ) Notice: Subject to any disclaimer, the term of this patent is extended or adjusted under 35 U.S.C. 154(b) by 414 days.

(21) Appl. No.: 13/838,095

(22) Filed: Mar. 15, 2013

(65) Prior Publication Data

US 2014/0265087 A1 Sep. 18, 2014

(51) Int. Cl.

*B23Q 3/06* (2006.01)
*B25B 5/00* (2006.01)
*B25B 5/12* (2006.01)
*B25B 11/02* (2006.01)

(52) U.S. Cl.

CPC ................. *B25B 5/003* (2013.01); *A63B 60/42* (2015.10); *B25B 5/12* (2013.01); *B25B 11/02* (2013.01)

(58) Field of Classification Search

None
See application file for complete search history.

(56) References Cited

U.S. PATENT DOCUMENTS 4,292,006 A * 9/1981 Davies .................. B28B 11/125 409/131
5,906,539 A * 5/1999 Tabel ........................ B25H 1/02 248/188.2
2005/0093218 A1* 5/2005 Perez ................. A63B 59/0074 269/126

* cited by examiner

*Primary Examiner* — Joseph J Hail
*Assistant Examiner* — Brian Keller
(74) *Attorney, Agent, or Firm* — Oliff PLC

(57) ABSTRACT

A clamping device for use with a golf club head. The clamping device may include a base and a holding device which is rotatably coupled to the base. The holding device may include at least first and second engagement portions. Each engagement portion is configured to at least partially accommodate an iron or wedge type golf club head, and prevent such club head from moving along a plane which is defined by the holding device. The clamping device may also include first and second clamp members which are each coupled to the base so as to be alignable with and operative to firmly seat corresponding golf club head within respective ones of the first and second engagement portions of the holding device.

5 Claims, 4 Drawing Sheets

CLAMPING DEVICE FOR A GOLF CLUB HEAD

BACKGROUND

1. Field of the Invention

The present invention relates generally to clamping mechanisms, and more particularly, to a clamping device which is uniquely configured for use in conjunction with an iron or wedge type golf club head for the purpose of securing the golf club head to allow for the stamping of a logo or other indicia into a prescribed area of the exterior surface.

2. Description of the Related Art

Golf club heads typically include indicia displayed on one or more areas of the exterior surface. The indicia may include a logo of the club manufacturer, the model of the club, or an indicator describing the club type. Along these lines, those golf clubs commonly referred to as "irons" each typically include a single digit numerical identifier ranging from "3" to "9" disposed on the sole of the club head, with those golf clubs commonly referred to as "wedges" typically including a numerical identifier corresponding to the degree of loft of the club face disposed on the sole thereof (e.g., 52°, 56°, 60°). The indicia typically included on the sole of iron and wedge type golf club heads is often stamped. The stamping operation imparts a level of permanence to the indicia, thus making it less susceptible to being worn off as a result of the long term abrasive effects of the sole of the club head coming into contact with the ground. In many golf club heads, such indicia is stamped into the club head at the manufacturing facility using specialized tooling and equipment.

However, in certain circumstances, it is desirable to stamp additional indicia into a prescribed area of the exterior surface of an iron or wedge type golf club head after the club head leaves the manufacturing facility. For instance, a golfer may desire a higher level of golf club customization by having his/her name, initials, or nickname stamped into the heads of iron and/or wedge type golf clubs carried in the bag. A public or private golf course may also want its name or logo stamped into the heads of the iron and/or wedge type golf clubs it owns and provides as rental sets to visiting players.

In order to stamp indicia into an iron or wedge type golf club head, such club head must first be secured in a manner ensuring its stability during the stamping process. If the stamping is to be performed at a location remote from the manufacturing facility such that the precision stamping equipment is not available, securing the club head typically necessitates the utilization of generic clamping devices, such as a vice, C-clamp, etc. Once the club head is secured, the indicia may be stamped into the club head.

Although the utilization of the aforementioned generic clamping devices may provide some degree of usefulness in securing the club head for stamping, there are several deficiencies associated therewith. For instance, since these clamping devices are not specifically tailored for accommodating the shapes/surface contours typically defined by iron and wedge type golf club heads, they present obstacles in achieving the level of clamping force required to firmly secure the club head and successfully complete the stamping process without giving rise to a substantial risk of damaging those surfaces of the club head which are actually contacted or engaged thereby. Furthermore, the unique contours of the club head may make it difficult to secure the club head within such a generic clamping device in a position which would effectively expose that portion or area of the exterior surface which is to be subjected to the supplemental stamping operation. Although the clamping capabilities of the specialized stamping equipment/tooling located at the manufacturing facility can accommodate the unique contours of the club head without damaging the same, such tooling is typically immobile, or difficult to easily transport to remote locations, such as PGA® tour events, sporting goods stores, or public/private golf facilities, where such supplemental stamping is likely to be performed for reasons such as those described above.

Therefore, there is a need in the art for a small, lightweight, and easily portable clamping mechanism or device specifically configured and adapted for clamping an iron or wedge type club head to allow indicia to be stamped into an exterior surface.

SUMMARY

In accordance with the present invention, there is provided a portable clamping device specifically designed to clamp an iron or wedge type golf club head in a position which allows indicia to be easily stamped thereon. The clamping device is small and lightweight, and may be easily deployed to various locations for on-site stamping.

In an embodiment, the clamping device may include a base and a holding device which is rotatably coupled to the base. The holding device preferably includes at least first and second engagement portions. Each engagement portion is configured to at least partially accommodate an iron or wedge type golf club head (e.g., a right-handed club head or a left-handed club head), and prevent such club head from moving along a plane which is defined by the holding device.

The clamping device may also include first and second clamp members which are each coupled to the base so as to be alignable with respective ones of the first and second engagement portions of the holding device. In this regard, the holding device is rotatable relative to the base to selectively align the first and second clamp members with the first and second engagement portions, respectively. Along these lines, the holding device may be rotatable between a first position wherein the first clamp member is aligned with the first engagement portion, and a second position wherein the second clamp member is aligned with the second engagement portion.

When placed into alignment with the first engagement portion, the first clamp member is selectively moveable relative to the holding device between a release position wherein it does not obstruct the placement of a club head into or the removal of the club head from within the first engagement portion, and a clamping position wherein it is placeable into and maintainable in direct engagement with a club head in a manner firmly securing or seating the same within the first engagement portion. Similarly, when placed into alignment with the second engagement portion, the second clamp member is selectively moveable relative to the holding device between a release position wherein it does not obstruct the placement of a club head into or the removal of the club head from within the second engagement portion, and a clamping position wherein it is placeable into and maintainable in direct engagement with a club head in a manner firmly securing or seating the same within the second engagement portion. The first and second clamp members may be identically configured to each other, and may each include a pivot arm having an adjustment arm coupled thereto, wherein the adjustment arm is translatable relative to the pivot arm to accommodate the configuration of a corresponding club head. The adjustment arm may include a distal engagement member formed from a resilient material to mitigate damage to a club head when the adjustment arm is engaged thereto.

The holding device may comprise a circular plate. The first and second engagement portions may be diametrically opposed to each other within the plate. In addition, the plate may have an outer diameter of less than about twelve inches.

The first and second engagement portions may be defined by respective ones of first and second recesses formed within (e.g., machined into) the plate. The first and second recesses may each have a shape which is complementary to the contour of at least a portion of the peripheral boundary of a corresponding, prescribed iron or wedge type golf club head, including a right-handed club head or a left-handed club head as indicated above.

In another embodiment, as an alternative to the aforementioned first and second recesses, the first and second engagement portions of the holding device may each comprise a plurality of independently adjustable stop members coupled to the plate in a prescribed arrangement. The stop members may be segregated into two separate sets thereof, with the stop members of each set being independently moveable relative to the plate to engage at least a portion of the peripheral boundary of a corresponding iron or wedge type golf club head, thus effectively allowing for a selective adjustment in the size and shape of a respective one of the first and second engagement portions. In this example, each set of the stop members may optionally be used in conjunction with a recess which is formed in the plate to partially accommodate an iron or wedge type golf club head but, unlike the aforementioned first and second recesses, is not specifically shaped to be complementary to the contour of the peripheral boundary defined by such club head.

In another embodiment, the first and second engagement portions of the holding device may comprise respective ones of a pair of club head engagement inserts which are each removeably attached to the plate. In this regard, each club head engagement insert defines a recess that is complementary to the contour of at least a portion of the peripheral boundary of a corresponding iron or wedge type golf club head. The removable attachment of each club head engagement insert to the plate allows for the selective substitution thereof with a club head engagement insert defining an alternatively shaped recess for accommodating a different club head.

In another embodiment, the first and second clamp members may each be substituted with a plurality of smaller clamping elements coupled to the plate in a prescribed arrangement. In this regard, like the stop members described above, the clamping elements may be segregated into two separate sets thereof, with the clamping elements of each set being independently moveable relative to the plate to engage a peripheral portion of an exposed surface of a corresponding iron or wedge type golf club head as effectively allows a central area of the exposed surface to be unobstructed by such clamping elements. In this example, the first and second recesses may also be eliminated, or may each be substituted with a recess which is similar to that described above for potential use in conjunction with the stop members, and is thus not specifically shaped to be complementary to the contour of the peripheral boundary of a club head.

The various exemplary aspects described above may be implemented individually or in various combinations. These and other features and advantages of the clamping device according to the invention in its various aspects and demonstrated by one or more of the various examples will become apparent after consideration of the ensuing description, the accompanying drawings, and the appended claims.

BRIEF DESCRIPTION OF THE DRAWINGS

The drawings described below are for illustrative purposes only and are not intended to limit the scope of the present invention in any way. Exemplary implementations will now be described with reference to the accompanying drawings, wherein.

Common reference numerals are used throughout the drawings and detailed description to indicate like elements.

DETAILED DESCRIPTION

Figure 1:
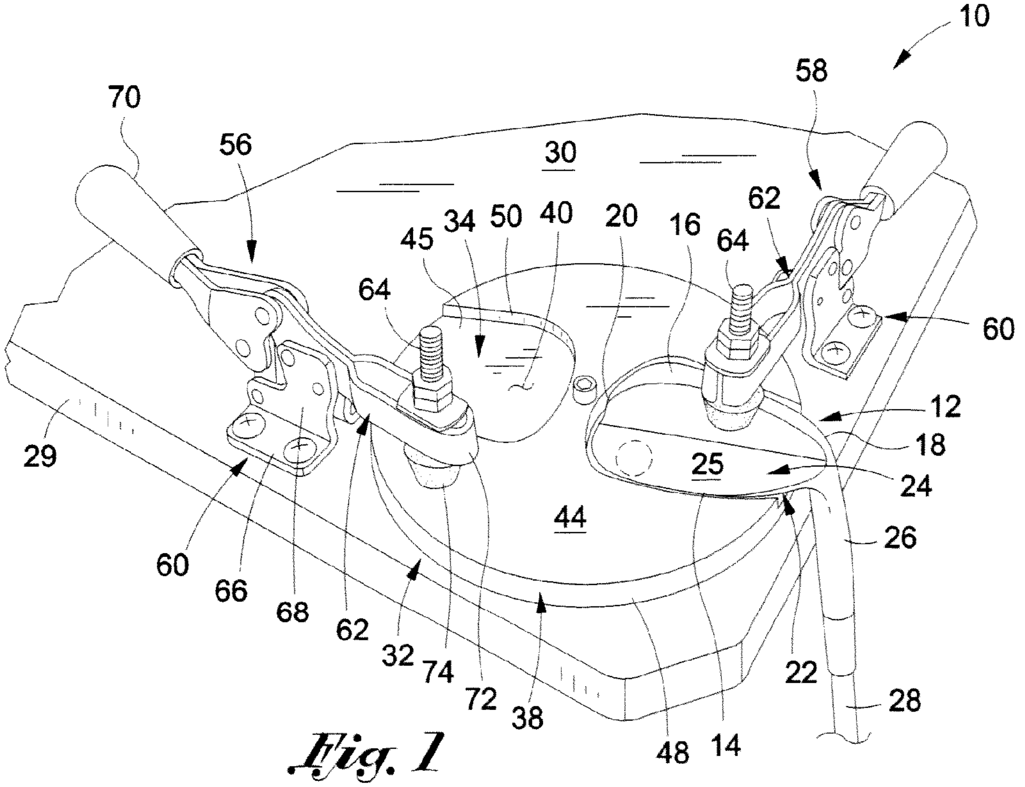
FIG. 1 is a top perspective view of a clamping device according to one embodiment of the present invention, depicting an exemplary wedge-type golf club head as being operatively clamped within the clamping device.
Figure 2:
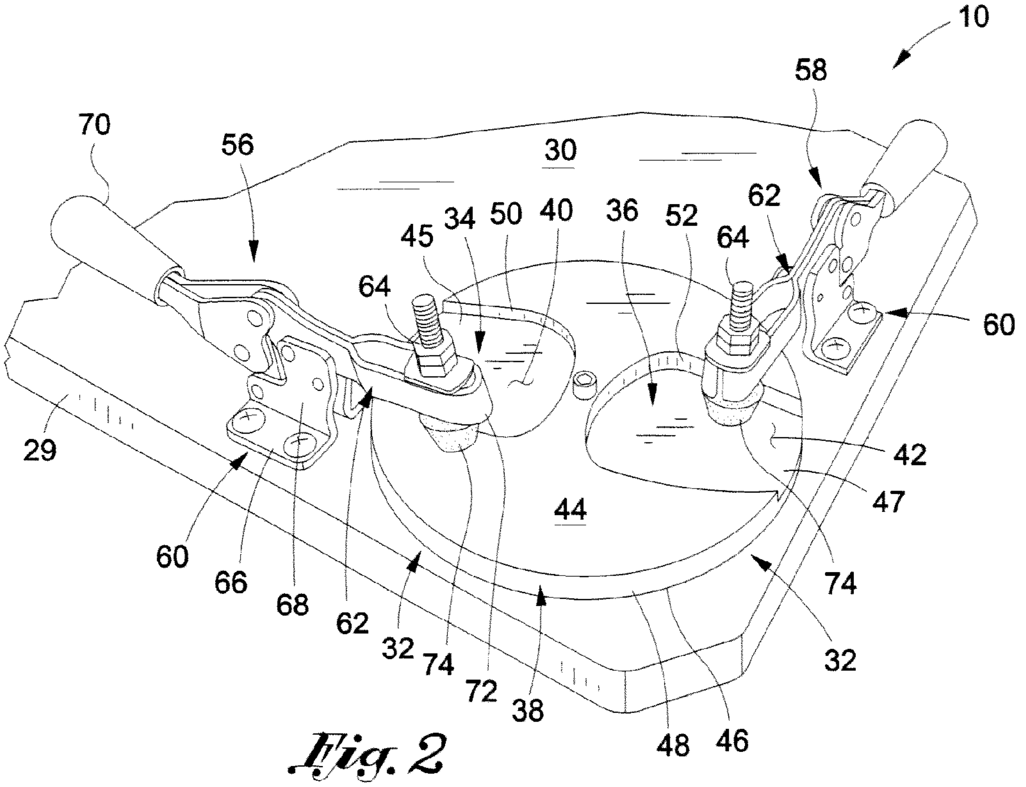
FIG. 2 is a top perspective view of the clamping device FIG. 1 with the wedge-type golf club head removed therefrom.
Figure 3:
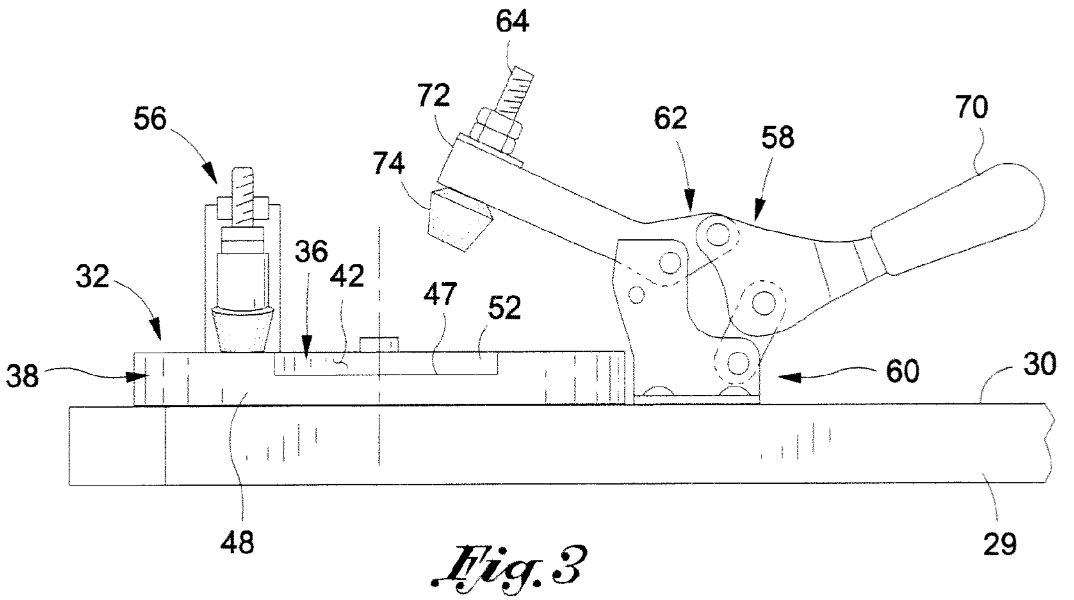
FIG. 3 is a side elevational view of the clamping device depicted in FIG. 2.

Referring now to the drawings wherein the showings are for purposes of illustrating various aspects of the present invention only, and not for purposes of limiting the same, FIGS. 1-3 depict a clamping device 10 constructed in accordance with one embodiment of the present invention. As will be described in more detail below, the clamping device 10 is uniquely configured to secure an iron or wedge type golf club head 12 in a manner allowing for the performance of a customized stamping operation thereon. As used herein, the "club head 12" is intended to generically identify any iron or wedge-type golf club head, including those which have a right-handed or left-handed configuration. In this regard, the identification of the "club head 12" is not intended to be limited to an iron or wedge type golf club head of any particular manufacturer, or of any particular size, shape or contour. The structural attributes of the clamping device 10 allows for the easy transport thereof for use in remote locations, (i.e., remote from the manufacturing facility), such as a PGA® tour event, a private or public golf course, or a pro shop. The structural attributes of the clamping device 10 further allow it to accommodate the particular, unique contours of the club head 12 as facilitates ease of use and prevents damage to the club head 12 during the stamping operation.

As indicated above, the clamping device 10 is adapted to secure the club head 12 in a prescribed position suitable for stamping indicia into a prescribed area of the exterior surface of the club head 12. In accordance with the present invention, it is contemplated that the club head 12, as being an iron or wedge-type club head, will define a top portion 14, a bottom or sole portion 16, a heel portion 18 and a toe portion 20. The club head 12 further includes a front portion 22 and an opposed rear portion 24. The front portion 22 defines a striking face of the club head 12 configured to strike a golf ball, with the rear portion 24 defining an exterior rear surface 25. In addition, the club head 12 includes a hosel 26 which is generally located at the heel side of the top portion 14 proximate the front portion 22. The hosel 26 is used to facilitate the attachment of a club shaft 28 to the club head 12. In most instances, the club head 12 includes various indicia stamped, formed, adhered or imprinted onto prescribed areas of the rear surface 25 thereof. Thus, several aspects of the present invention are directed toward clamping the club head 12 in a manner which allows a prescribed area of the rear surface 25 to be exposed or unobstructed as facilitates the operative engagement of a stamping tool to the rear surface 25 as part of a supplemental stamping operation.

The clamping device 10 includes a base 29 which, from the perspective shown in FIGS. 1-3, defines a generally planar top surface 30. Rotatably coupled to the base 29 is a holding device 32. The base 29 may be a table or table-like structure defining the top surface 30 which is of a size or dimension as makes it suitable to accommodate the rotatable engagement of the holding device 32 to a prescribed location thereon.

In the clamping device 10, the holding device 32 includes first and second engagement portions 34, 36. Each of the first and second engagement portions 34, 36 is adapted to accommodate and engage a corresponding club head 12 in manner which effectively restricts any movement of such club head 12 along a plane which is defined by the holding device 32 and generally parallel to the top surface 30 of the base 29. Though the holding device 32 shown in FIGS. 1 and 2 includes the first and second engagement portions 34, 36, those of ordinary skill in the art will recognize that potentially greater or fewer than two engagement portions may be included in the holding device 32 without departing from the spirit and scope of the present invention.

In the exemplary embodiment of the clamping device 10 shown in FIGS. 1-3, the holding device 32 comprises a circularly configured plate 38 which is of a prescribed outer diameter, typically less than of about twelve inches. In this regard, when viewed from the perspective shown in FIGS. 1-3, the plate 38 defines a generally planar top surface 44, an opposed, generally planar bottom surface 46 (which is disposed directly adjacent the top surface 30 of the base 29), and a peripheral side surface 48 which extends between the top and bottom surfaces 44, 46.

In the clamping device 10, the first and second engagement portions 34, 36 are defined by respective ones of first and second recesses 40, 42 formed within (e.g., machined into) the top surface 44 of the plate 38. The first and second recesses 40, 42 each extend to the peripheral side surface 48 of the plate 38 and downwardly from the top surface 44 to a prescribed depth therein. In the circularly configured plate 38, the first and second recesses 40, 42 are disposed in generally diametrically opposed relation to each other (i.e., are separated by an interval of approximately 180°). The first recess 40 defines a generally planar base surface 45 and a side surface 50 which extends generally perpendicularly relative to the base surface 45, with both the base and side surfaces 45, 50 terminating at the peripheral side surface 48 of the plate 38. Similarly, the second recess 42 defines a generally planar base surface 47 and a side surface 52 which extends generally perpendicularly relative to the base surface 47, with both the base and the side surfaces 47, 52 terminating at the peripheral side surface 48 of the plate 38.

In the clamping device 10, each of the side surfaces 50, 52 is specifically shaped so as to be complementary to the contour of at least a portion of the outer peripheral boundary of a club head 12 of corresponding size and shape when such club head 12 is placed within a corresponding one of the first and second recesses 40, 42 in a "stamping position." Stated another way, because of the unique profile of the side surface 50 thereof, the first recess 40 is adapted to accommodate only one club head 12 which is of a complementary shape or contour. The same holds true for the second recess 42 as a result of the unique profile of the side surface 52 thereof.

As is shown in FIG. 1, when an exemplary club head 12 is placed within the second recess 42 in the aforementioned "stamping position," the striking face of such club head 12 is abutted against the base surface 47. With the club head 12 in this particular orientation, a substantial portion of the peripheral boundary defined thereby is abutted against or at least disposed in extremely close proximity to the complementary side surface 52 defined by the second recess 42. In this regard, the side surface 52 of the second recess 42 extends along at least that portion of the peripheral boundary of the club head 12 as is defined by prescribed surfaces or edges of the top, bottom and toe portions 14, 16, 20. As a result, as indicated above, the side surface 52 effectively prevents the club head 12 from moving along the plane defined by the plate 38. Further, the rear surface 25 of the club head 12 is exposed, and faces away from the top surface 30 defined by the base 29, thus making it accessible to a stamping tool or equipment. Similarly, though not shown in FIG. 1, when an exemplary club head 12 is placed within first recess 40 in the "stamping position," the striking face of such club head 12 is abutted against the base surface 45, with a substantial portion of the peripheral boundary defined thereby concurrently being abutted against or at least disposed in extremely close proximity to the complementary side surface 50 defined by the first recess 40, again resulting in the exposure of the rear surface 25 of the club head 12. Thus, in the exemplary embodiment of the clamping device 10 shown in FIGS. 1-3, only two particular club heads 12 are suited to be accommodated thereby. By way of example and not by way of limitation, a right-handed club head 12 of a particular size and shape may be accommodated by the second recess 42, with a left-handed club head 12 of the same size and shape being accommodated by the first recess 40.

By virtue of its rotatable connection to the base 29, the plate 38 is adapted to facilitate the selective alignment of the first and second engagement portions 34, 36 (and hence the first and second recesses 40, 42) with respective ones of an identically configured pair of first and second clamp members 56, 58 which are each attached to the base 29. As further shown in FIGS. 1-3, the first and second clamp members 56, 58 each comprises a mounting bracket 60, a pivot arm 62 pivotally connected to the mounting bracket 60, and an adjustment arm 64 movably coupled to the pivot arm 62. The mounting bracket 60 includes a base flange portion 66 which includes a plurality of apertures formed therein to facilitate the attachment of the mounting bracket 60 to the base 29 through the use of mechanical fasteners. In addition to the base flange portion 66, each mounting bracket 60 includes a support flange portion 68 which extends generally perpendicularly relative to the base flange portion 66 and is configured to accept the pivotal attachment of the pivot arm 62 thereto. The pivot arm 62 defines opposed proximal and distal end portions 70, 72. The proximal end portion 70 defines a handle adapted to be gripped by a user to facilitate the movement of a corresponding one of the first and second clamp members 56, 58 between a clamping position and a release position, both of which will be described in more detail below. The adjustment arm 64 defines a distal engagement member 74 that is preferably formed from a resilient material, such as rubber, to protect the club head 12 from damage when the same is contacted by the engagement member 74 upon the actuation of the corresponding one of the first and second clamp members 56, 58 to the clamping position.

In each of the first and second clamp members 56, 58, the moveable attachment of the adjustment arm 64 to the pivot arm 62, and in particular the distal end portion 72 thereof, allows the adjustment arm 64 to optionally be secured at any one of a multiplicity of prescribed locations along the length of the distal end portion 72 as may be needed to properly align the engagement member 74 with a prescribed location of the rear surface 25 of a club head 12 positioned within a respective one of the first and second recesses 40, 42. Such moveable attachment also allows for a selective adjustment in the distance separating the engagement member 74 from the distal end portion 72 as may be needed to cause the engagement member 74 to apply a requisite level of compressive pressure to a club head 12 positioned within a respective one of the first and second recesses 40, 42 when a corresponding one of the first and second clap members 56, 58 is actuated to its clamping position. Along these lines, the adjustment arm 64 includes an externally threaded shaft having multiple locking nuts threadably engaged thereto on opposite sides of the distal end portion 72 of the pivot arm 62. The loosening of the locking nuts allows the adjustment arm 64 to be slidably moved to a prescribed location along the length of the distal end portion 72, with the subsequent re-tightening of the locking nuts effectively maintaining the adjustment arm 64 in such location. Further, upon the loosening of the locking nuts, the rotation of the adjustment arm 64 in a clockwise direction effectively draws the engagement member 74 closer to the distal end portion 72, with the rotation of the adjustment arm 64 in a counter-clockwise direction effectively increasing the distance separating the engagement member 74 from the distal end portion 72. The re-tightening of the locking nuts, in addition to maintaining the adjustment arm 64 in a prescribed location along the length of the distal portion 72, also maintains the engagement member 74 at a prescribed separation distance from the distal end portion 72.

As indicated above, the holding device 32 is rotatable relative to the base 29 so as to selectively align the first and second clamp members 56, 58 with respective ones of the first and second engagement portions 34, 36, and more particularly respective ones of the first and second recesses 40, 42. When viewed from the perspective shown in FIGS. 1-3, the first clamp member 56 is "aligned" with the first recess 40 when the actuation of the first clamp member 56 from its release position to its clamping position results in the engagement member 74 of the adjustment arm 64 thereof being positioned over any portion of the base surface 45 of the first recess 40, as opposed to being positioned over any portion of the top surface 44 of the plate 38. Likewise, the second clamp member 58 is "aligned" with the second recess 42 when the actuation of the second clamp member 58 from its release position to its clamping position results in the engagement member 74 of the adjustment arm 64 thereof being positioned over any portion of the base surface 47 of the second recess 42.

In the clamping device 10, the plate 38 is selectively rotatable between a first position associated with the alignment between the first clamp member 56 and the first recess 40, and a second position associated with the alignment between the second clamp member 48 and the second recess 42. The plate 38 may be configured such that the rotation thereof is restricted to the first and second positions described above. Such restricted rotation may be achieved by forming an arcuate slot within the base 29 and a complementary stop post on the bottom surface 46 of the plate 38 which is advanced into such slot. In this regard, the abutment of the stop post against one end of the slot may facilitate the orientation of the plate 38 into the first position, with the abutment of the stop post against the opposite end of the slot facilitating the orientation of the plate 38 into the second position.

Having thus described the structural attributes of the clamping device 10, an exemplary method of using the same will now be described with specific reference to FIG. 1 which, as indicated above, depicts an exemplary club head 12 as operatively engaged to the clamping device 10. With the first and second clamp members 56, 58 initially each normally residing in the release position, the plate 38 is rotated or indexed to either of the aforementioned first and second positions, depending on which of the first and second engagement portions 34, 36, and more particularly the first and second recesses 40, 42, is going to be used to accommodate a complementary, corresponding club head 12. Assuming use of the second recess 42 is contemplated, subsequent to the movement of the plate 38 to the second position, the club head 12 is caused to assume the above-described "stamping position" within the second recess 42, as shown in FIG. 1. Thereafter, the second clamp member 58 is actuated from its release position to its clamping position. When actuated to the clamping position, the engagement member 74 of the second clamp member 58 is brought into direct engagement with a prescribed area of the rear surface 25 of the club head 12, and applies a prescribed level of compressive pressure to the club head 12 as effectively maintains the striking face thereof in firm engagement to the bottom surface 47 of the second recess 42. With the club head 12 being firmly seated within the second engagement portion 36 in this manner, a stamping operation may be completed on an area of the rear surface 25 thereof which is not obstructed by the pivot arm 62 or adjustment arm 64 of the second clamp member 58. After the stamping operation has been completed, the actuation of the second clamp member 58 from its clamping position back to its release position allows for the removal of the club head 12 from within the second recess 42. As will be recognized, the same methodology could be employed for the stamping of a club head 12 positioned within the first recess 40 subsequent to the indexing or rotation of the plate 38 to its first position.

Figure 4:
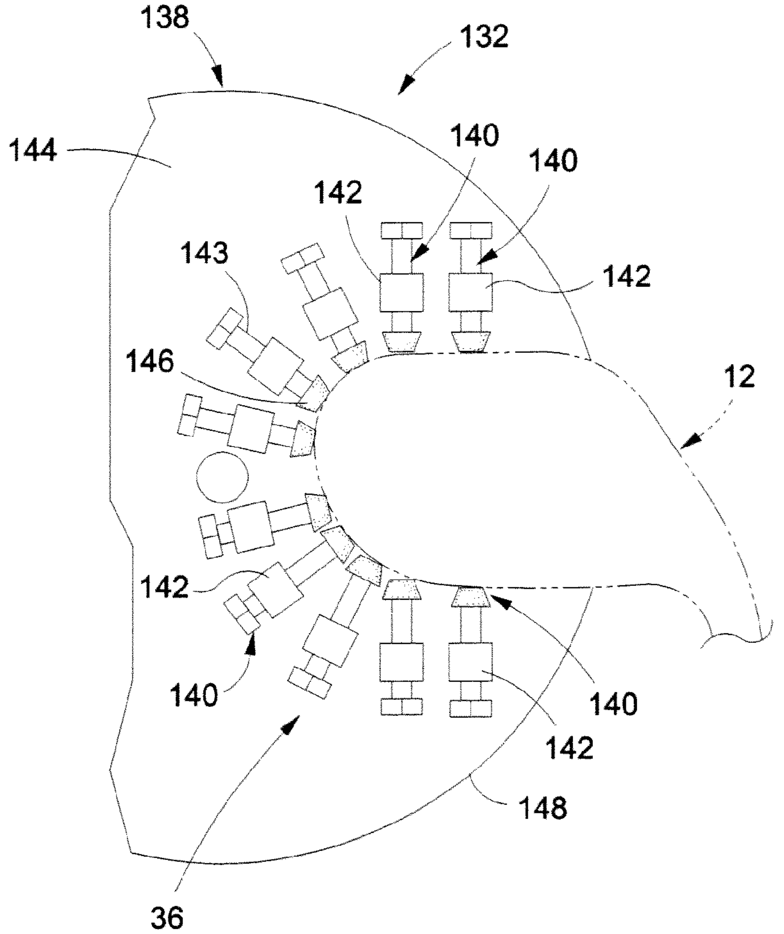
FIG. 4 is a top plan view of another embodiment of the clamping device including at least one set of moveable stop members for engaging a peripheral portion of an iron or wedge type golf club head.

Referring now to FIG. 4, in accordance with another embodiment of the present invention, the above-described holding device 32 is substituted with a holding device 132. The holding device 132, like the holding device 32, includes the first and second engagement portions 34, 36, with only the second engagement portion 36 being shown in FIG. 4. However, in the holding device 132, the above-described plate 38 of the holding device 32 is substituted with a circularly configured plate 138 which is of a prescribed outer diameter. When viewed from the perspective shown in FIG. 4, the plate 138 defines a generally planar top surface 144, an opposed, generally planar bottom surface (not shown) which is disposed directly adjacent the top surface 30 of the base 29, and a peripheral side surface 148 which extends between the top surface 144 and the bottom surface.

In the plate 138 of the holding device 132, as an alternative to the aforementioned first and second recesses 40, 42, the first and second engagement portions 34, 36 each comprise a plurality of independently adjustable stop members 140 which are coupled to the top surface 144 of the plate 138 in a prescribed arrangement. The stop members 140 are preferably segregated into two separate sets thereof, with the stop members 140 of each set being independently moveable relative to the plate 138 to engage at least a portion of the peripheral boundary of a corresponding club head 12, thus effectively allowing for a selective adjustment in the size and shape of a respective one of the first and second engagement portions 34, 36. Though, as indicated above, only that set of the stop members 140 corresponding to the second engagement portion 36 is depicted, another set of the stop members 140 arranged in the same pattern relative to the peripheral side surface 148 of the plate 138 would correspond to the first engagement portion 34 and would further preferably be positioned in generally diametrically opposed relation to the set of stop members 140 corresponding to the second engagement portion 36.

In the holding device 132, each stop member 140 comprises a base element 142 having an externally threaded shaft element 143 threadably engaged thereto. Attached to one end of the shaft element 143 is an engagement element 146. In this regard, the engagement element 146 is preferably formed from a resilient material, such as rubber or the like, to protect the club head 12 from damage when engaged thereby. Due to the threadable engagement of the shaft element 143 of each stop member 140 to the corresponding base element 142 thereof, the rotation of the shaft element 143 in a clockwise direction facilitates the movement of the corresponding engagement element 146 away from the base element 142. Conversely, the counter-clockwise rotation of the shaft element 143 facilitates the movement of the corresponding engagement element 146 toward the base element 142.

As indicated above, since the stop members 140 of each set thereof are each independently moveable relative to each other, the size and shape of each of the first and second engagement portions 34, 36 of the holding device 132 are capable of being adjusted as allows for the accommodation any one of a multiplicity of different club heads 12 of corresponding size and shape. Those of ordinary skill in the art will recognize that due to the suitability of each set of the stop members 140 to accommodate and engage the peripheral boundary of a club head 12 of virtually any size and shape, one set of the stop members 140, and hence one of the first and second engagement portions 34, 36, can optionally be eliminated from the holding device 132. In this instance, it necessarily follows that a corresponding one of the first and second clamp members 56, 58 would also be eliminated from a clamping device having the holding device 132 integrated therein. It is also contemplated that the stop members 140 of any set included in the holding device 132 may be configured to exert a sufficient circumferential force on a club head 12 engaged thereby as allows for the stamping of such club head 12 without the use of any of the first and second clamp members 56, 58, thus allowing for the elimination thereof. Moreover, those of ordinary skill in the art will recognize that the present invention contemplates the use of adjustable stops having configurations differing from those of the stop members 140 specifically described above. By way of example and not by way of limitation, it is contemplated that such adjustable stops may alternatively comprise some form of restraining element which is moveable within and securable at a prescribed location along a corresponding slot disposed within the plate 138.

Figure 5:
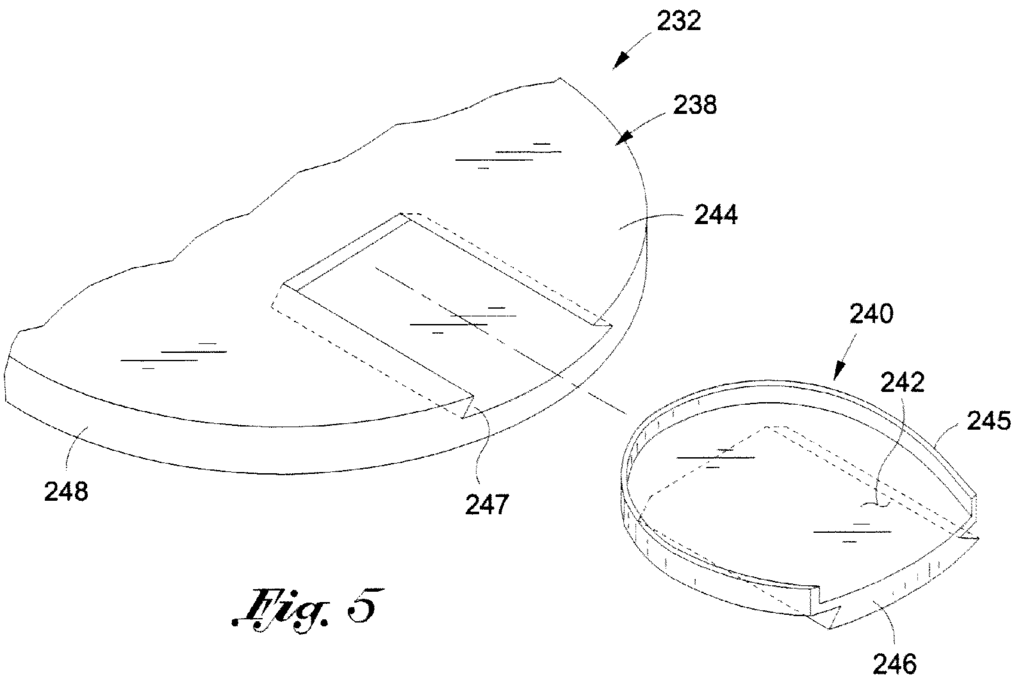
FIG. 5 is a partial, exploded perspective view of another embodiment of the clamping device including one or more engagement inserts removeably attachable to the holding device thereof and each having a shape which is complementary to that of a corresponding iron or wedge type golf club head.
Figure 6:
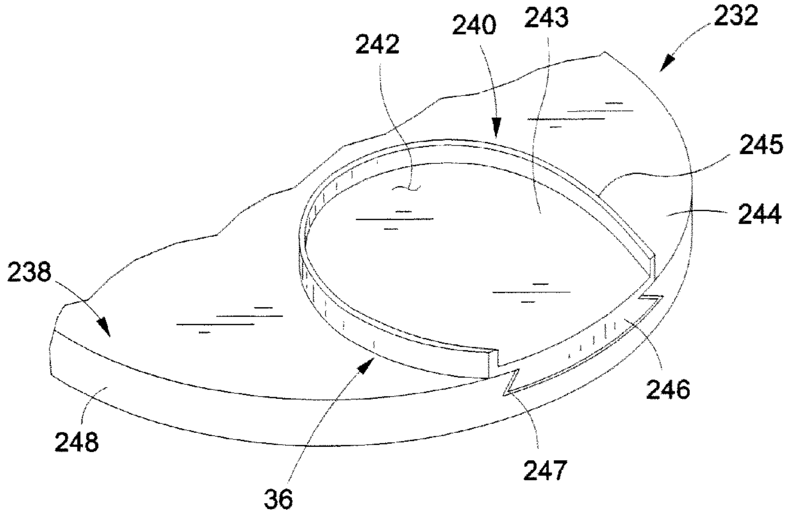
FIG. 6 is a partial, top perspective view of the clamping device of FIG. 5 depicting an engagement insert as being attached to the holding device thereof.

Referring now to FIGS. 5 and 6, in accordance with another embodiment of the present invention, the above-described holding device 32 is substituted with a holding device 232. The holding device 232, like the holding device 32, includes the first and second engagement portions 34, 36, with only the second engagement portion 36 being shown in FIG. 6. However, in the holding device 232, the above-described plate 38 of the holding device 32 is substituted with a circularly configured plate 238 which is of a prescribed outer diameter. When viewed from the perspective shown in FIGS. 5-6, the plate 238 defines a generally planar top surface 244, an opposed, generally planar bottom surface (not shown) which is disposed directly adjacent the top surface 30 of the base 29, and a peripheral side surface 248 which extends between the top surface 244 and the bottom surface.

In the holding device 232, the first and second engagement portions 34, 36 comprise respective ones of a pair of club head engagement inserts 240, only one of which corresponding to the second engagement portion 36 is shown in FIGS. 5 and 6. Each club head engagement insert 240 defines a recess 242 that is complementary to the contour of at least a portion of the peripheral boundary of a corresponding club head 12. More particularly, when an exemplary club head 12 is placed within the recess 242 in the aforementioned "stamping position" of an engagement insert 240 releasably attached to the plate 238, the striking face of such club head 12 is abutted against a base surface 243 defined by the engagement insert 240. With the club head 12 in this particular orientation, a substantial portion of the peripheral boundary defined thereby is abutted against or at least disposed in extremely close proximity to a complementary side wall 245 of the engagement insert 240 which also partially defines the recess 242 thereof. Along these lines, the side wall 245 is used to perform a function analogous to that of the above-described side surfaces 50, 52 of the first and second recesses 40, 42.

In the holding device 232, a dove-tail locking arrangement is preferably used to facilitate the removable attachment of each engagement insert 240 to the plate 238. More particularly, such dove-tail locking arrangement comprises a male member 246 which is formed on the engagement insert 240 and is slidably advanceable into a corresponding, complementary female slot 247 formed within the top surface 244 of the plate 238 and extending to the peripheral side surface 248 thereof. As will be recognized by those of ordinary skill in the art, the removable attachment of each engagement insert 240 to the plate 238 allows for the selective substitution thereof with another engagement insert 240 defining an alternatively shaped recess 242 for accommodating a different club head 12.

Those of ordinary skill in the art will recognize that due to the ability to selectively interface any one of a multiplicity of differently configured engagement inserts 240 to the plate 238 to accommodate and engage the peripheral boundary of a club head 12 of any size and shape, one of the first and second engagement portions 34, 36 can optionally be eliminated from the holding device 232. In this instance, it again necessarily follows that a corresponding one of the first and second clamp members 56, 58 would also be eliminated from a clamping device having the holding device 232 integrated therein.

Figure 7:
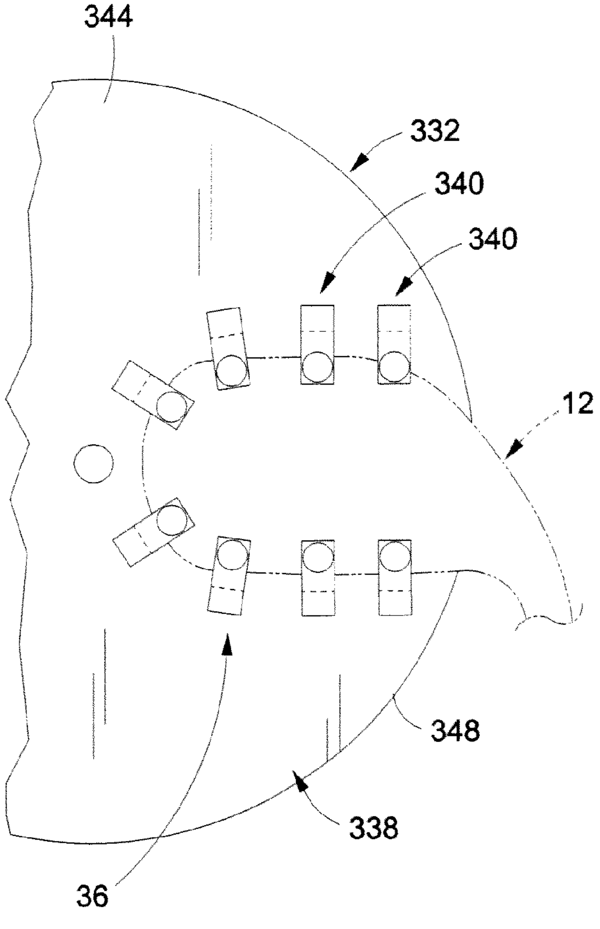
FIG. 7 is a top plan view of another embodiment of the clamping device including at least one set of clamping elements for engaging a peripheral portion of an iron or wedge type golf club head.
Figure 8:
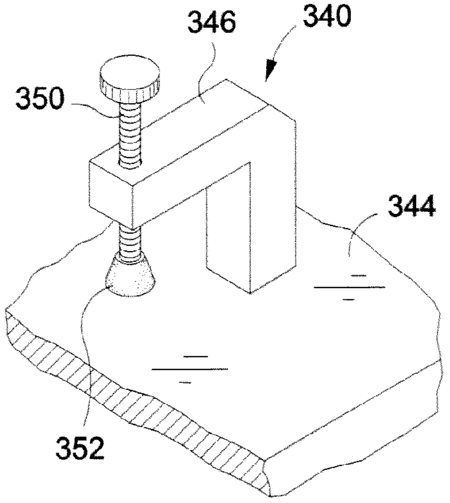
FIG. 8 is an enlarged, top perspective view of one of the clamping elements shown in FIG. 7.

Referring now to FIGS. 7 and 8, in accordance with another embodiment of the present invention, the above-described holding device 32 is substituted with a holding device 332. The holding device 332, like the holding device 32, includes the first and second engagement portions 34, 36, with only the second engagement portion 36 being shown in FIG. 7. However, in the holding device 332, the above-described plate 38 of the holding device 32 is substituted with a circularly configured plate 338 which is of a prescribed outer diameter. When viewed from the perspective shown in FIG. 7, the plate 338 defines a generally planar top surface 344, an opposed, generally planar bottom surface (not shown) which is disposed directly adjacent the top surface 30 of the base 29, and a peripheral side surface 348 which extends between the top surface 344 and the bottom surface.

In the plate 338 of the holding device 332, both the first and second recesses 40, 42 are eliminated, with the aforementioned first and second clamp members 56, 58 further being eliminated in any clamping device having the holding device 332 integrated therein. In this regard, in the holding device 332, the first and second engagement portions 34, 36 each comprise a plurality of independently adjustable clamping elements 340 which are coupled to the top surface 344 of the plate 338 in a prescribed arrangement. The clamping elements 340 are preferably segregated into two separate sets thereof, with the clamping elements 340 of each set being independently moveable relative to the plate 338 to engage at least a peripheral portion of the rear surface 25 of a corresponding club head 12 as effectively allows a central area of the rear surface 25 to be unobstructed by such clamping elements 340. Though, as indicated above, only that set of the clamping elements 340 corresponding to the second engagement portion 36 is depicted, another set of the clamping elements 340 arranged in the same pattern relative to the peripheral side surface 348 of the plate 338 would correspond to the first engagement portion 34 and would further preferably be positioned in generally diametrically opposed relation to the set of clamping elements 340 corresponding to the second engagement portion 36.

In the holding device 332, each clamping element 340 comprises an L-shaped base element 346 having an externally threaded shaft element 350 threadably engaged thereto. Attached to one end of the shaft element 350 is an engagement element 352. In this regard, the engagement element 352 is preferably formed from a resilient material, such as rubber or the like, to protect the club head 12 from damage when engaged thereby. Due to the threadable engagement of the shaft element 343 of each clamping element 340 to the corresponding base element 346 thereof, the rotation of the shaft element 350 in a clockwise direction facilitates the movement of the corresponding engagement element 352 away from the base element 346 toward the top surface 344 of the plate 338. Conversely, the counter-clockwise rotation of the shaft element 350 facilitates the movement of the corresponding engagement element 352 toward the base element 346 and away from the top surface 344.

As indicated above, since the clamping elements 340 of each set thereof are each independently moveable relative to each other, the first and second engagement portions 34, 36 of the holding device 332 are capable of being adjusted as allows for the accommodation any one of a multiplicity of differently sized and shaped club heads 12. Since clamping elements 340 are disposed adjacent and along the outer peripheral boundary of the club head 12, the central portion of the rear surface 25 thereof is unobstructed thereby and easily accessible by the stamping equipment. Those of ordinary skill in the art will recognize that due to the suitability of each set of the clamping elements 340 to accommodate and engage a club head 12 of virtually any size and shape, one set of the clamping elements 340, and hence one of the first and second engagement portions 34, 36, can optionally be eliminated from the holding device 332. Moreover, those of ordinary skill in the art will recognize that the present invention contemplates the use of adjustable clamping elements having configurations differing from those of the clamping elements 340 specifically described above.

This disclosure provides various embodiments of the present invention. The scope of the present invention is not limited by these embodiments. Numerous variations, whether explicitly provided for by the specification or implied by the specification, such as variations in structure, dimension, type of material and manufacturing process may be implemented by one of skill in the art in view of this disclosure.

What is claimed is:

1. A golf club clamping device configured for use with at least one conventionally-shaped golf club head having a planar striking face and a periphery, the golf club clamping device comprising:

a base;

a holding device rotatably coupled to the base, the holding device defining a device plane and at least first and second recess each having a shape generally complementary to the periphery, the recesses each configured to at least partially accommodate the golf club head in a manner preventing movement thereof along the device plane, and in a manner in which the first and second recesses each include a generally planar bottom surface configured to abut the generally planar striking face;

a first clamp member attached to the base and selectively alignable with the first recess through the rotation of the holding device, the first clamp member being moveable between clamping and release positions and operative to secure the golf club head within the first recess when in the clamping position and in a manner in which at least a portion of the rear surface of the golf club head opposite the generally planar bottom surface is exposed; and a second clamp member attached to the base and selectively alignable with the second recess through the rotation of the holding device, the second clamp member being moveable between clamping and release positions and operative to secure the golf club head within the second recess when in the clamping position.

2. The clamping device of claim 1, wherein the holding device comprises a plate having at least the first and second recesses formed therein.

3. The clamping device of claim 2, wherein the first and second recesses are diametrically opposed to each other.

4. The clamping device of claim 2, wherein the first recess has a shape complementary to at least a portion of the peripheral boundary of a left-handed golf club head, and the second recess has a shape complementary to at least a portion of the peripheral boundary of a right-handed golf club head.

5. The clamping device of claim 1, wherein each of the first and second clamp members is configured to allow for selective adjustments in a level of compressive pressure applied to and in a point of contact with the golf club head when actuated to the clamping position.

* * * * *